Jan. 2, 1951 L. E. CLEMENTS ET AL 2,536,422
HANDSAW ATTACHMENT
Filed Oct. 25, 1946
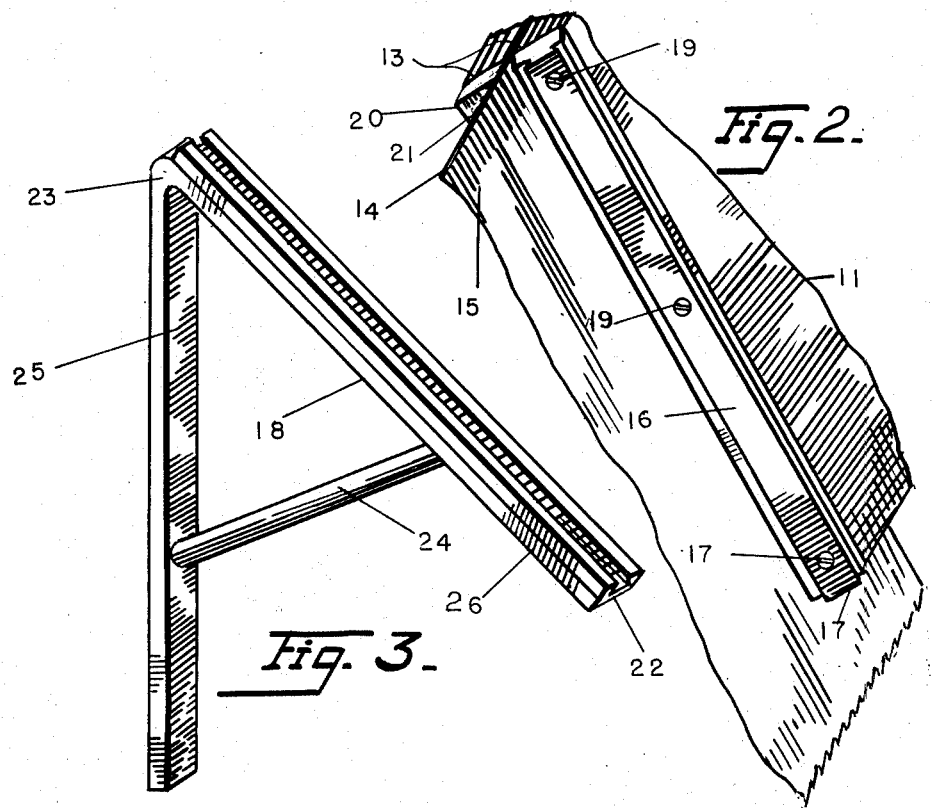
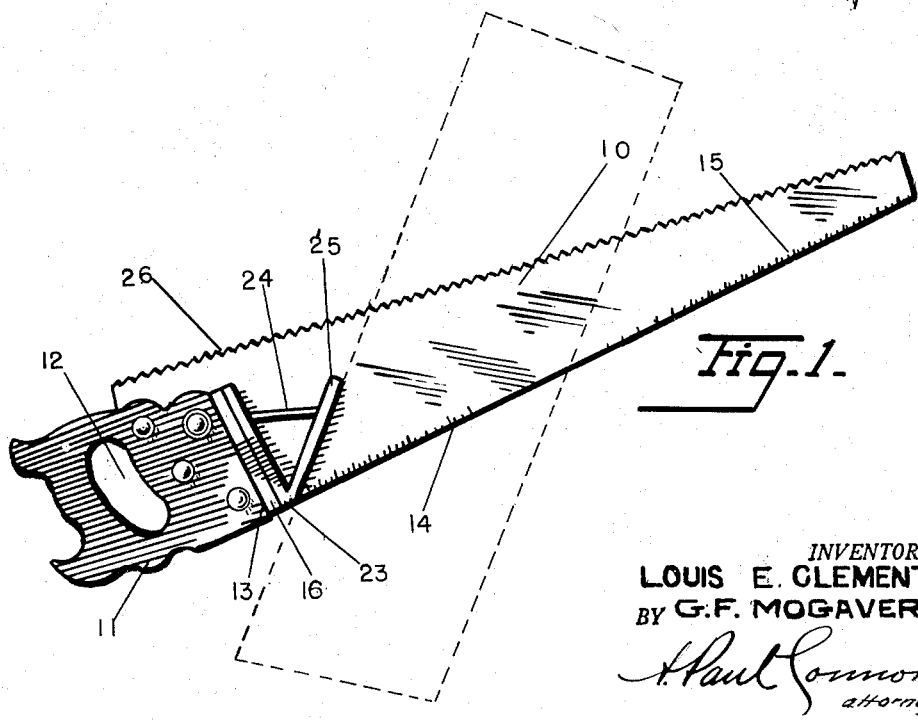
INVENTOR.
LOUIS E. CLEMENTS
BY G. F. MOGAVERO.
attorney.

Patented Jan. 2, 1951

2,536,422

UNITED STATES PATENT OFFICE 2,536,422

HANDSAW ATTACHMENT

Louis E. Clements, Baltimore, and Giovanni F. Mogavero, Lansdowne, Md.

Application October 25, 1946, Serial No. 705,600

1 Claim. (Cl. 7—13)

This invention relates to mechanics' tools and more particularly to the class that pertains to hand saws.

Hand saws as usually provided are designed and used to cut wood and material of a relatively soft structure. When angular cuts are required in the material, a line is drawn over it with a suitable scriber placed against a tool termed a miter, after which a square or straight edge with measurements cut therein is employed to check it off at the length or size desired. The disadvantage of this method, is that it requires three or more tools to accomplish the work, and these tools in turn take up considerable room in the mechanic's tool box. The square used by carpenters has always been an awkward tool to carry around from job to job, and by reason of its projecting edge during such carrying is a source of danger to others and damage to itself.

It is therefore an object of the present invention, to provide a new and improved hand saw that will avoid one or more of the disadvantages and limitations of the prior art.

A further object of the hereindescribed invention is to provide a new and improved hand saw that will afford compact and simple means for measuring, marking, and mitering material to be cut by it, within its structure.

Other objects of this invention will become apparent as the invention is more fully described.

For a clearer understanding of the invention, reference is made to the appended drawings and the following description, wherein a particular form of the invention is illustrated by way of example, while the scope of the invention is more particularly pointed out in the claim.

Referring to the drawings:

Fig. 1 is a side view of a hand saw and an angular mitering attachment assembled with it;

Fig. 2 is a perspective view of a part of the saw and blade broken away to indicate the manner in which the angular mitering attachment is connected thereto; and Fig. 3 is a detail in perspective of the angular mitering attachment used in this embodiment of the saw.

Similar reference characters refer to similar parts throughout the drawings.

In a particular form of the invention, a saw of conventional construction comprises a handle which holds a cutting blade. The blade has a straight back extending at right angles from the lower side of the handle, adjacent the edge of which are engraved markings for making measurements with it. An angular attachment is mounted on this edge of the handle for enabling the saw to be laid across the work to be sawed by it, and marked off at the desired angle. In this form, the saw takes up no more room than an ordinary saw.

In the construction indicated in the drawings, a conventional form of hand saw blade 10, is mounted on a handle 11, having the usual hand hole 12 in it, to permit handling. The edges 13 of the handle 11 forming the lower side, are cut straight and at right angles to the rear or back 14 of the blade. Standard linear measurements are marked on the blade on both sides at 15, starting from the handle and ending at the tip of the blade. These measurements 15 are adjacent the straight edge of the blade and cooperate with the elements 16 and 20 to facilitate the scribing of lines on a board. This facilitates the use of the saw, as it enables the saw to be used for laying off measurements accurately on the material, without the use of an extra tool.

The lower side 13 of the handle 11 has the blade 10 running down its middle and has the two elements 16 and 20 disposed on the separated parts fitting closely against them. The element 16 consists preferably of a piece of non-corroding metal that is plane, level, and flat on the back where it contacts the lower side 13, but its front side is milled to a dovetailed tongue 17 running longitudinally down its middle. Screws 19 serve to hold it in place on the handle. This piece is termed the tongue piece. The element 20 on the other part of the side 13 is likewise held with screws 19 and is flat without a tongue. It is the same thickness as the element 16 and serves as a contact edge when necessary to draw a line at right angles across the board, against the edge of which it is butted. The face of the element 20 is indicated at 21.

The tongue 17 projects from the element 16, and is contoured to fit into a dove-tail groove 22 in the A-formed angular mitering attachment, indicated in Fig. 3. The groove 22 is milled into the leg 26 of the attachment, so that the latter may be readily slid onto the tongue 16 or removed therefrom. The second leg 25 of the attachment is extended from one end of the leg 26 where they join together in apexed form, at an angle of 45° or other angle selected. The face of the leg 25 is used for scribing lines on the work to be cut, when the other leg 26 is adjusted on the tongue 16. The attachment can be slid in position against the handle assembly to enable a scriber to draw a line on the material to be sawed that is either at an angle of 45° to the right or 45° to the left. The board or material thus laid out and marked, can be cut by the saw following the line scribed. The dotted outline in Fig. 1 shows the board with the saw blade laid on it ready to be marked off on the miter. At the same time, measurements on the line drawn can be scaled off. These measurements may be termed a scale if preferred, and may be in terms of inches, meters or any other selected type of units. When it is desired to draw a line at right angles to the back of the blade, the attachment is removed leaving the straight face of the element 16 to provide a straight edge against which to butt the edge of the board with.

While but one form of the invention is shown in the drawings it is not desired to limit this invention to that form or construction or in any other way, otherwise than limited by the prior art, as it is appreciated that other forms could be made that would be encompassed within the scope of the claim.

Having thus described the invention, what is claimed is:

In a saw structure, a bar element fastened to said saw and disposed at right angles to the back of the blade of the saw, said element including dove-tail means on its outer face and parallel to the plane of the blade, an angular mitering attachment including a pair of legs angularly positioned in regard to each other and forming an apex where they are joined to form an angle between them as aforesaid, including dove-tailed means corresponding with the aforesaid dove-tail means to fit with each other and lie against a flat board with one of the legs against the edge of said board while the back of said blade is disposed across the board to enable a line to be scribed thereon at an angle predetermined by the angular relation of the last mentioned leg to the back of said blade.

LOUIS E. CLEMENTS.
GIOVANNI F. MOGAVERO.

REFERENCES CITED

The following references are of record in the file of this patent:

UNITED STATES PATENTS

| Number | Name | Date |
|---|---|---|
| 1,170,591 | White | Feb. 8, 1916 |
| 1,268,756 | Nicole | June 4, 1918 |
| 1,411,017 | Guerriero | Mar. 28, 1922 |
| 1,563,495 | Jones | Dec. 1, 1925 |